(12) United States Patent
Simske et al.

(10) Patent No.: US 9,147,141 B2
(45) Date of Patent: Sep. 29, 2015

(54) PRINTER SAMPLE FEATURE SET

(75) Inventors: Steven J Simske, Fort Collins, CO (US);
Malgorzata M Sturgill, Fort Collins, CO (US); Jason S Aronoff, Fort Collins, CO (US); Guy Adams, Stroud (GB); Paul S Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/347,316

(22) PCT Filed: Jan. 31, 2012

(86) PCT No.: PCT/US2012/023254
§ 371 (c)(1),
(2), (4) Date: Mar. 26, 2014

(87) PCT Pub. No.: WO2013/115788
PCT Pub. Date: Aug. 8, 2013

(65) Prior Publication Data
US 2014/0333969 A1    Nov. 13, 2014

(51) Int. Cl.
G06K 15/00 (2006.01)
G06K 15/02 (2006.01)
H04N 1/40 (2006.01)
H04N 1/405 (2006.01)

(52) U.S. Cl.
CPC ............ *G06K 15/1881* (2013.01); *H04N 1/405* (2013.01); *H04N 1/40062* (2013.01)

(58) Field of Classification Search
None
See application file for complete search history.

(56) References Cited

U.S. PATENT DOCUMENTS

| 5,883,973 | A | 3/1999 | Pascovici et al. |
| 6,533,385 | B1 * | 3/2003 | Mackay et al. ................. 347/19 |
| 6,612,684 | B2 * | 9/2003 | Mackay et al. ................. 347/40 |
| 7,054,461 | B2 * | 5/2006 | Zeller et al. ................... 382/100 |
| 8,094,344 | B2 * | 1/2012 | Cattrone et al. ............. 358/3.26 |

(Continued)

FOREIGN PATENT DOCUMENTS

| JP | 2004-234406 A | 8/2004 |
| JP | 2005-208005 | 8/2005 |
| JP | 2010067068 | 3/2010 |

OTHER PUBLICATIONS

Mikkilineni, et al.; "Printer Identification Based on Graylevel Co-occurence Features for Security and Forensic Applications"; < http://spie.org/x648.html?product_id=593796 >, On pp. 430-440; vol. 5681; Mar. 21, 2005.

(Continued)

*Primary Examiner* — Dung Tran
(74) *Attorney, Agent, or Firm* — Tarolli, Sundheim, Covell & Tummino

(57) ABSTRACT

A system can comprise a memory to store machine readable instructions and a processing unit to access the memory and execute the machine readable instructions. The machine readable instructions can comprise a feature set extractor to extract a feature set from each of a plurality of digital images of print samples. The feature set can be a filtered feature set that includes a feature set characterizing a printer that printed a given print sample of the print samples. The machine readable instructions can also comprise a cluster component to determine clusters of the print samples based on the feature set of each of the plurality of scanned images of the print samples. The machine readable instructions can further comprise a printer identifier to identify the printer of the print samples based on the clusters of the print samples.

15 Claims, 10 Drawing Sheets

(56) References Cited

U.S. PATENT DOCUMENTS

| | | | |
|---|---|---|---|
| 8,711,440 B2* | 4/2014 | Hardy | 358/448 |
| 2004/0170324 A1* | 9/2004 | Eguchi et al. | 382/199 |
| 2006/0126094 A1 | 6/2006 | Haas et al. | |
| 2006/0197962 A1 | 9/2006 | Chen et al. | |
| 2007/0201106 A1* | 8/2007 | Cattrone et al. | 358/463 |
| 2008/0013113 A1 | 1/2008 | Gonzalez et al. | |
| 2009/0016604 A1 | 1/2009 | Ke et al. | |
| 2009/0164517 A1 | 6/2009 | Shields et al. | |
| 2009/0245514 A1 | 10/2009 | Singer | |
| 2012/0062924 A1* | 3/2012 | Fukushima | 358/1.13 |
| 2014/0285855 A1* | 9/2014 | Capobianco et al. | 358/3.28 |
| 2014/0348375 A1* | 11/2014 | Ulichney et al. | 382/100 |
| 2014/0348376 A1* | 11/2014 | Ulichney et al. | 382/100 |
| 2014/0348395 A1* | 11/2014 | Pollard et al. | 382/112 |

OTHER PUBLICATIONS

Ryu, et al.: "Electrophotographic Printer Identification by Halftone Texture Analysis"; < http://ieeexplore.ieee.org/xpls/abs_all.jsp?arnumber=5495377 > On pp. 1846-1849; Mar. 14-19, 2010.

Simske, et al.; "A System for Forensic Analysis of Large Image Sets"; IEEE 2009; p. 16-20 ; Dec. 17, 2009.

Wu, et al.: "Printer Forensics Based on Page Document's Geometric Distortion"; < http://ieeexplore.ieee.org/xpl/freeabs_all.jsp?arnumber=5413420 > On pp. 2909-2912; Mar. 25, 2010.

* cited by examiner

PRINTER SAMPLE FEATURE SET

BACKGROUND

A printer is a peripheral that produces a text and/or graphics of documents stored in electronic form on physical print media such as paper or transparencies. Printers can print images by printing a halftone. A halftone is the reprographic technique that simulates continuous tone imagery through the use of dots, varying either in size, in shape or in spacing. "Halftone" can also be used to refer specifically to the image that is produced by this process.

DETAILED DESCRIPTION

Figure 1:
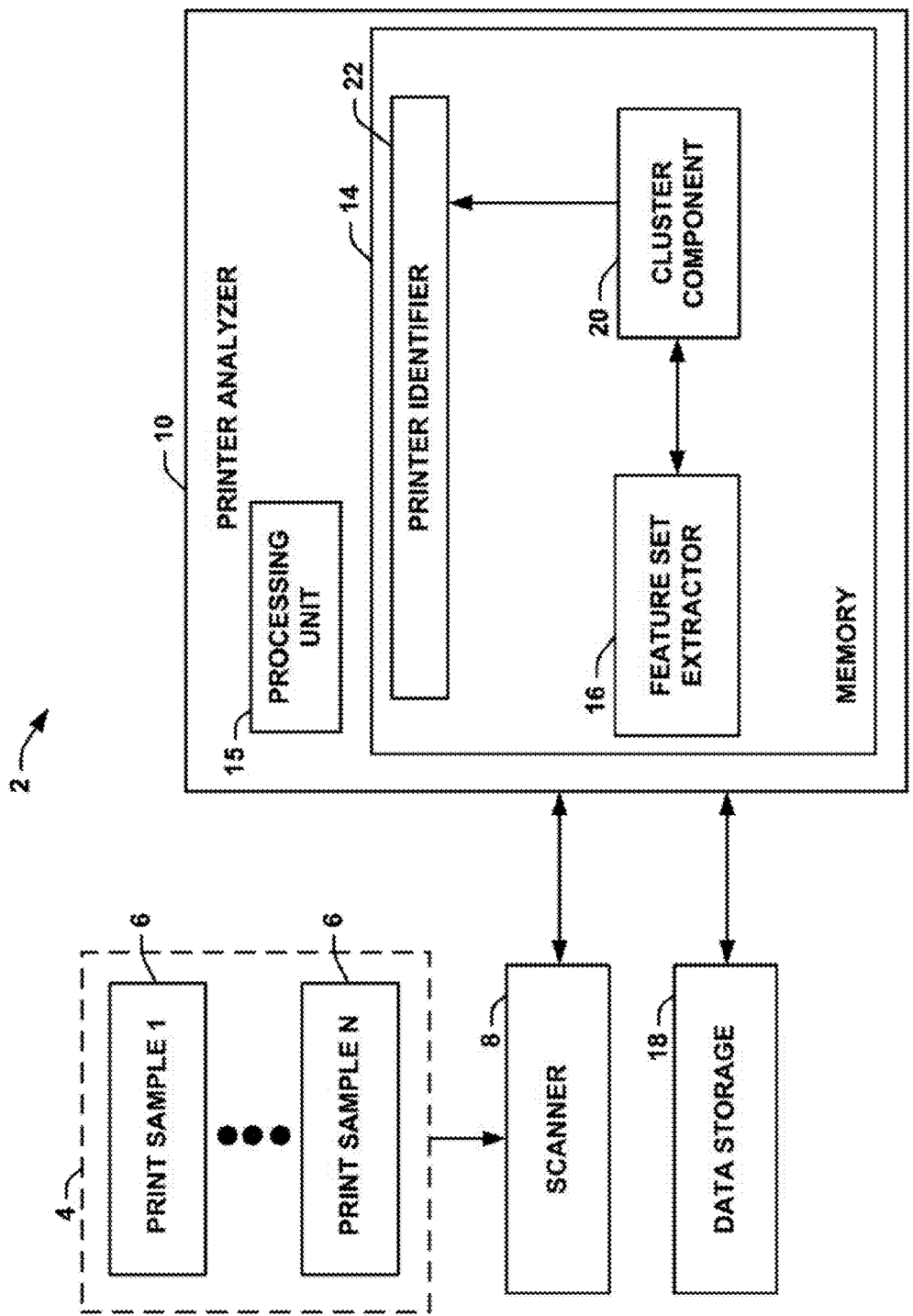
FIG. 1 illustrates an example of a system for determining a printer of print samples.

FIG. 1 illustrates an example of a system 2 for analyzing N number of print samples 4 to identifying a printer that printed a given print sample 6 of the N number of prints samples 4, where N is an integer greater than or equal to one. Each print sample 6 of the N number of print samples 4 could be implemented, for example, as a color print sample, a black-and-white print sample, etc. In some examples, each print sample 6 could be implemented as printing on packaging (e.g., packaging of an ink or toner cartridge).

Each of the N number of print samples 4 can be scanned by a scanner 8. The scanner 8 can be implemented, for example, as a high resolution color image scanner with a scanning resolution of about 600 dots per inch (dpi) or more. In some examples, the scanner 8 could be implemented as a linear imaging array, such as a flatbed scanner. In other examples, the scanner 8 could be implemented as a two dimensional array, such as a camera. In some examples the camera could be integrated with a smartphone. The scanner 8 can provide a digital image of each of the N number of print samples 4 to a printer analyzer 10. The printer analyzer 10 could be implemented, for example, as a computer.

For purposes of simplification of explanation, in the present example, different components of the system 2 are illustrated and described as performing different functions. However, in other examples, the functions of the described components can be performed by different components, and the functionality of several components can be combined and executed on a single component. The components can be implemented, for example, as machine readable instructions, hardware (e.g., an application specific integrated circuit), or as a combination of both (e.g., firmware). In other examples, the components could be distributed among remote devices across a network (e.g., external web services).

In some examples, the printer analyzer 10 can be integrated with the scanner wherein the printer analyzer 10 can be implemented on a smart phone. In other examples, the printer analyzer 10 could be implemented separately from the scanner 8, and implemented as a personal computer, a server, etc. The printer analyzer 10 can include a memory 14 for storing machine readable instructions. The printer analyzer 10 can also include a processing unit 15 for accessing the memory 14 and executing the machine readable instructions. The processing unit 15 can be implemented, for example, as a processor core. The memory 14 can include a feature set extractor 16.

Figure 2:
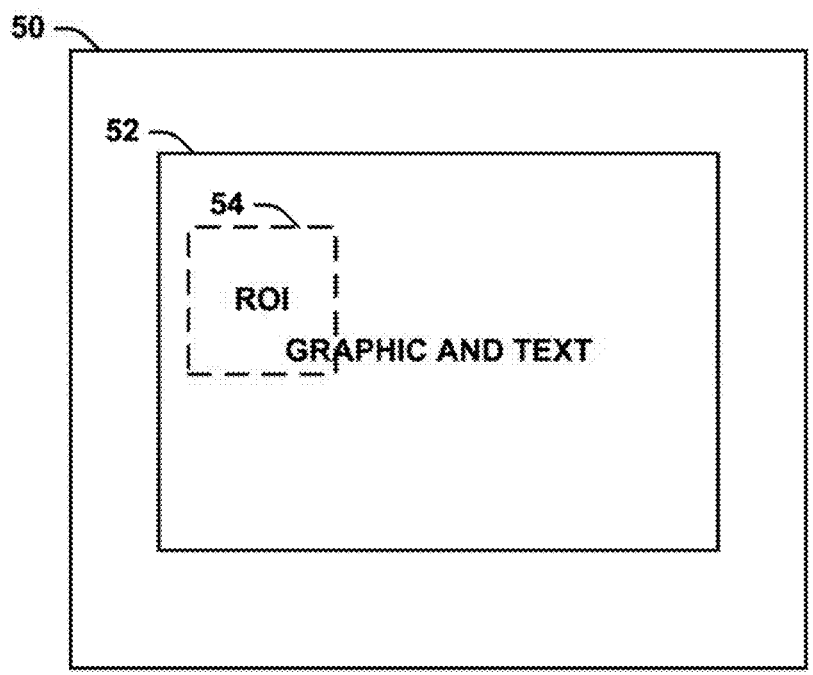
FIG. 2 illustrates an example of a print sample.

The feature set extractor 16 can analyze a digital image of the given print sample 6. FIG. 2 illustrates an example of a digital image of a given print sample 50, such as the given print sample 6 illustrated in FIG. 1. The digital image of the given print sample 50 can include a text and graphics portion 52. It is to be understood that in some examples, the text portion and graphics portion can be separated (e.g., segmented) into different portions. An area on the digital image can be identified (e.g., by the feature set extractor 16 of FIG. 1), which area can be referred to as a region of interest (ROI) 54.

Referring back to FIG. 1, the feature set extractor 16 can identify a feature set in the ROI. The feature set can be a set of features extracted from the ROI. In some examples, the feature set can include geometric features, such as a major/minor axis, the circularity, a centroid, a color gamut, optical density and contrast, etc. In other examples, the feature set could include differential features (e.g., subtracted images). In yet other examples, the feature set could include distribution-based features, such as satellites and porosities. In still yet other examples, the feature set could be a combination of features of different types. To extract the feature set, the feature set extractor 16 can employ, for example, image subtraction, Fast Fourier Transform (FFT), etc. The feature set can be implemented as a filtered feature set that includes features characterizing a printer of a given print sample 6 of the N number of print samples 4.

In some examples, the feature set extractor 16 can retrieve a master image from data storage 18. The data storage 18 could be implemented, for example, as a physical memory, such as RAM, a hard disk, etc. The master image could be implemented, for example, as a digital image of the ROI that is provided from a known source (e.g., a trusted source, a known counterfeiter, etc.). In this manner, the master image could be implemented as an "original" digital version of the ROI. In such a situation, the feature set in the ROI can be identified, for example, by subtracting the master image from the ROI. In other examples, the feature set extractor 16 can generate a modal image based on an ROI of each of the N number of print samples 4. The modal image can be implemented as an image with a lowest mean squared error from the remaining images. In this manner, the feature set of the ROI can be identified, for example, by subtracting the modal image from the ROI.

The feature set extractor 16 can provide a feature record to a cluster component 20 in the memory 14. The feature record can include, for example, data characterizing the feature set. The feature record can also include, for example, a print sample identifier. The print sample identifier can be employed, for example, to identify the particular print sample 6 from which the feature set was derived. The feature set extractor 16 can provide a feature record for each of the N number of prints samples 4, such that the feature set extractor 16 can provide N number of feature records, wherein each feature record corresponds to a given print sample.

The cluster component 20 can examine data in each of the N number of feature records. The cluster component 20 can plot a point in a data space (e.g., a cluster space) for each of the N number of print samples 4, wherein each point is based on the feature set associated with a corresponding feature record. The cluster component 20 can aggregate (e.g., cluster) the points in the clustering space to identify groups (e.g., clusters) of print samples 4. The cluster component 20 can employ, for example, a K-means or nearest neighbor technique to plot points in the clustering space and to identify the clusters of print samples 4. The cluster component 20 can provide cluster data to a printer identifier 22 stored in the memory 14. The cluster data can include, for example, data that characterizes the clusters of prints samples 4. The cluster data can also include data for identifying a print sample 6 that corresponds to a given point in the cluster space.

The printer identifier 22 can analyze the cluster data to identify a printer that printed a given print sample 6 of the N number of print samples 4, since each point (e.g., member) in a given cluster corresponds to a print sample 6 that was printed by the same printer. In some examples, the printer identifier 22 can assign a printer identification (ID) to each cluster. In this manner, the printer identifier 22 can determine that a print sample 6 corresponding to a member in a given cluster corresponds to a given printer ID.

In some examples, the printer identifier 22 can access the data storage 18 to retrieve historical data. The historical data can include, for example a feature set derived from past (historical) use. For instance, in one example, the feature set could represent a feature extracted from a print sample 6 generated by a specific type of printer, such as a flexography (flexo) printer, an offset printer, a Gravure printer, an inkjet printer, a LaserJet printer, etc. In such a situation, the printer identifier 22 can compare the feature set corresponding to a given point in the cluster space with the feature set in the historical data to determine the type of printer used to print the print sample 6 associated with a given point in the cluster space. In some examples, the historical data can also include a list of features to preclude from the feature set for specific types of printers. For instance, a metric related to a flexo printer may be not be applicable to a LaserJet printer.

By employing the system 2, a printer that printed a specific print sample 6 can be identified. Moreover, features, such as the type of printer associated with the printer that printed the specific print sample 6 can also be identified. In this manner, a user of the system 2 can determine if a given print sample 6 originated from an authorized source. For instance, in some examples, the print sample 6 could be the package of an ink or toner cartridge of a printer. By employing the system 2, the user could determine a set of print samples 4, which set corresponds to a cluster in the cluster space, have originated from an authorized source, such as an original equipment manufacturer (OEM). Additionally, the user could determine a set of print samples 4 that originated from an unauthorized source, such as a counterfeiter.

Figure 3:
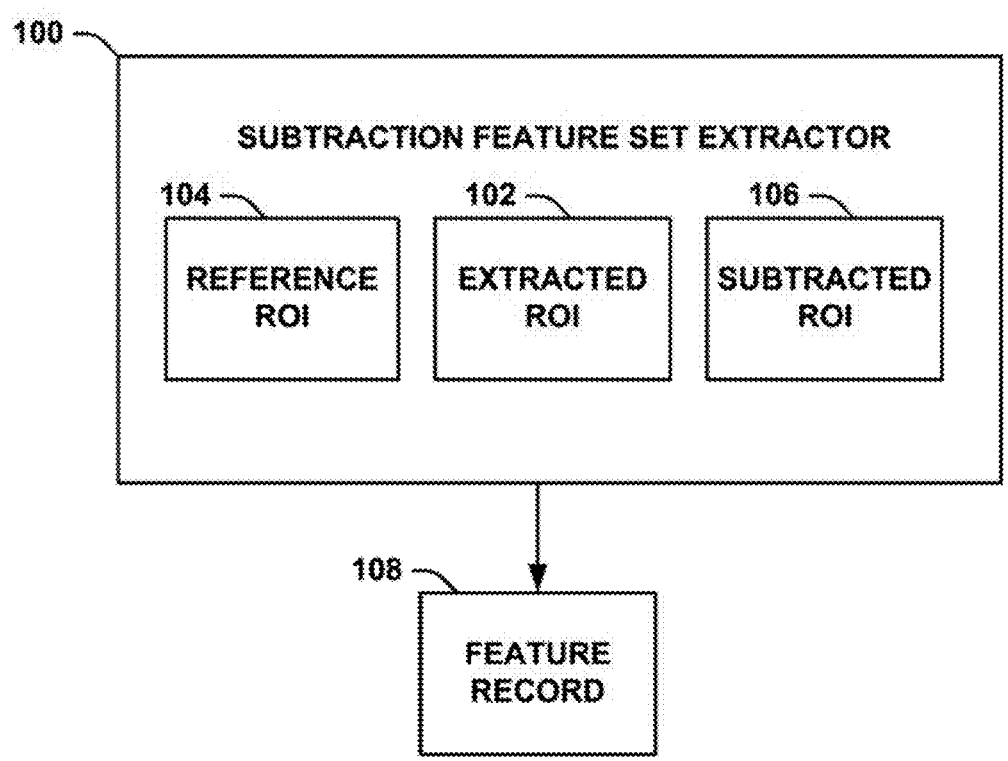
FIG. 3 illustrates an example of a subtraction feature set extractor.

FIG. 3 illustrates an example of a subtraction feature set extractor 100 that could be employed as the feature set extractor 16 illustrated in FIG. 1, or as a component thereof. The subtraction feature set extractor 100 can be implemented, for example, to determine a feature set of an image of the print sample by the employment of subtraction techniques. The subtraction feature set extractor 100 can provide an extracted ROI 102 from an image of a print sample, such as the given print sample 6 illustrated in FIG. 1. The subtraction feature set extractor 100 can determine a reference ROI 104. The reference ROI 104 could be, for example provided from data storage, such as the data storage 18 illustrated in FIG. 1. In such a situation, the reference ROI 104 could be implemented as a digital image of the ROI, provided from a known source (e.g., an original ROI). Alternatively, the reference ROI 104 could be implemented as an average ROI. In such a situation, the average ROI could be generated based on an average of images of print samples (e.g., the N number of print samples illustrated in FIG. 1).

The subtraction feature set extractor 100 can provide an extracted ROI 102 from an image of a print sample. The subtraction feature set extractor 100 can subtract the extracted ROI 102 from the reference ROI 104 to provide a difference ROI 106. The difference 106 could be searched for a feature set. Accordingly, the subtraction feature set extractor 100 can provide a feature record 108 that includes the difference ROI 106 and a print sample identifier that identifies the print sample from which the extracted ROI 102 was derived.

Figure 4:
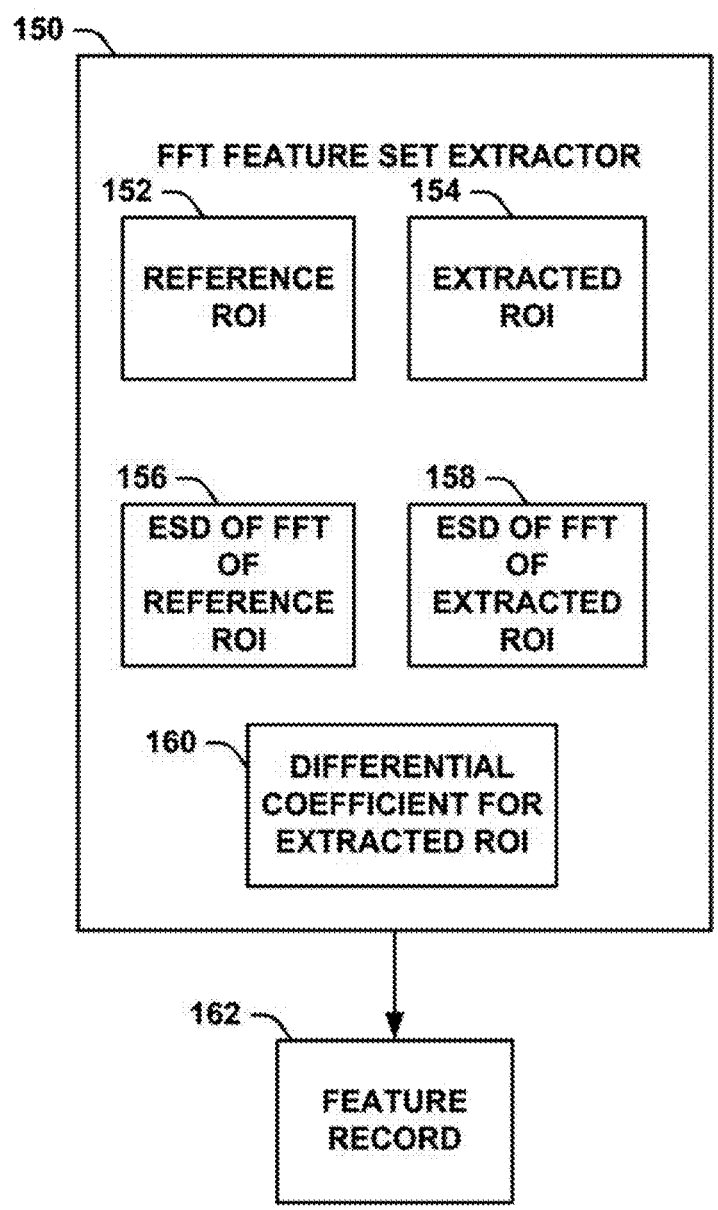
FIG. 4 illustrates an example of a Fast Fourier Transform (FFT) feature set extractor.

FIG. 4 illustrates an example of an FFT feature set extractor 150 that could be employed as the feature set extractor illustrated in FIG. 1, or as a component thereof. The FFT feature set extractor 150 can extract a feature set from a print sample by the employment of an FFT. The FFT feature set extractor 150 can provide a reference ROI 152 and an extracted ROI 154 in a manner similar to the manner described with respect to FIG. 3.

The FFT feature set extractor 150 can compute an FFT for the reference ROI 152 based on an intensity of pixels in the reference ROI 152. The reference ROI 152 and the extracted ROI 154 could be implemented as a series of dots, which can be referred to as a halftone of the ROI. The FFT of the reference ROI 152 can characterize a pattern of the halftone of the reference ROI 152, as well as the resolution of the halftone of the ROI and artifacts/defects that may exist in the ROI. Stated differently, the halftone of the ROI can have a carrier frequency that varies as a function of (i) a pattern of the halftone (ii) the printing resolution and (iii) artifacts/defects in the reference ROI 152. Additionally, the FFT feature set extractor 150 can compute an energy spectral density (ESD) for the FFT of the reference ROI 156. The ESD can be calculated from an FFT such that in the ESD, the sum of the coefficients, usually after deleting a DC coefficient, are normalized to sum to 1.0. The ESD of the FFT of the reference ROI 156 can characterize how the variance of a FFT is distributed with frequency.

Additionally, the FFT feature set extractor 150 can compute the FFT of the extracted ROI 154 based on an intensity of pixels in the extracted ROI 154. Similar to the FFT of the reference ROI 152, the FFT of the extracted ROI 154 can vary as a function of the halftone pattern, a printing resolution and artifacts/defects in the extracted ROI 154. In particular, the pattern (e.g., size of dots) of the halftone of the extracted ROI 154 can vary as a function of ink spread. That is, the FFT of the extracted ROI 154 can vary based on the type of ink employed to print the print sample associated with the extracted ROI 154. For instance, some inks dry faster than others. Thus, a slower drying ink may have more time to spread than a faster drying ink, such that dots of a halftone printed with the slower drying ink may be larger than those printed with the faster drying ink. Additionally, the FFT feature set extractor can compute an ESD of the FFT of the extracted ROI 158.

The ESD of the FFT of the reference ROI 156 can be subtracted from the ESD of the FFT of the extracted ROI 158 to provide a differential coefficient for the extracted ROI 160. In some examples, the subtraction can occur over multiple channels. The differential coefficient for the extracted ROI 160 can characterize differential content in the extracted ROI 154. In some examples, there can be more than one differential coefficient for the extracted ROI 160. The FFT feature set extractor 150 can provide a feature record 162 that includes the differential coefficient for the extracted ROI 160 and an identifier for the print sample from which the extracted ROI 154 was derived.

Figure 5:
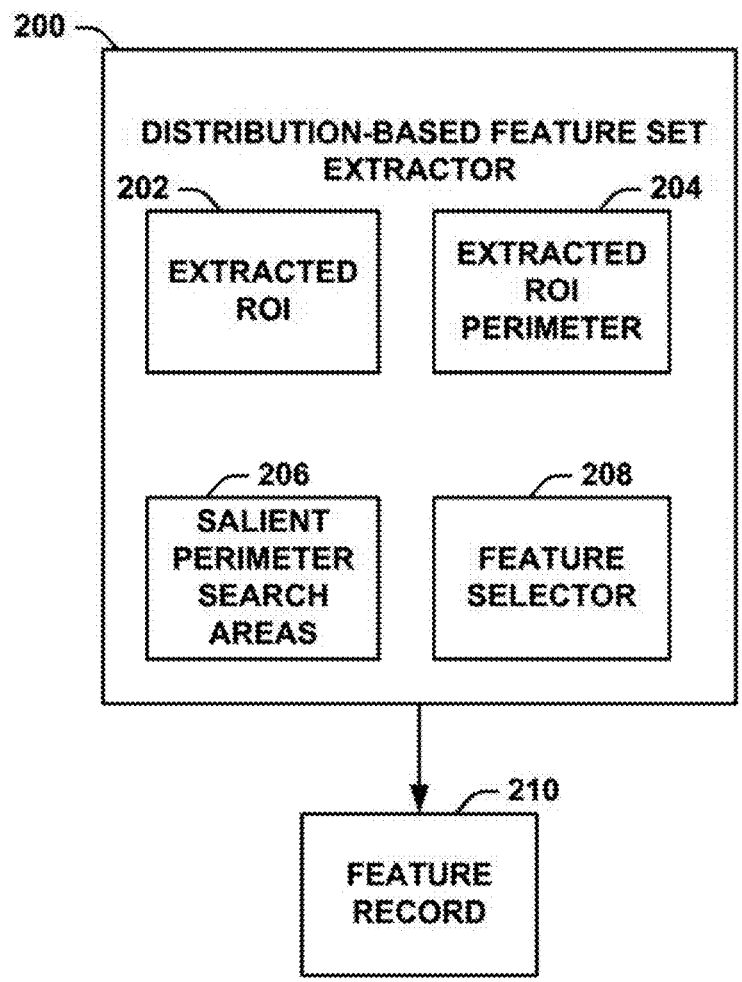
FIG. 5 illustrates an example of a distribution based feature set extractor.
Figure 6:
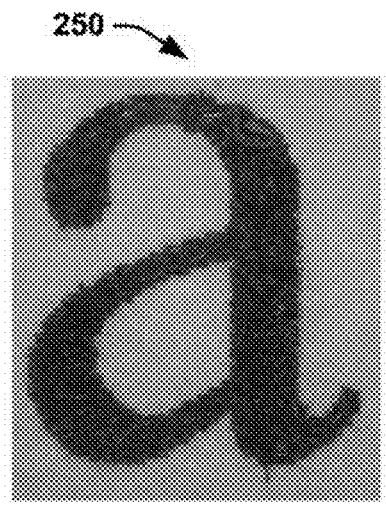
FIG. 6 illustrates example of a region of interest.

FIG. 5 illustrates an example of a distribution-based feature set extractor 200 that could be employed as the feature set extractor 16 illustrated in FIG. 1, or as a component thereof. The distribution-based feature set extractor 200 can extract a feature from a print sample by employing salient perimeter searching techniques. In one example, the distribution-based feature set extractor 200 can process an extracted ROI 202 derived from the print sample. The extracted ROI 202 could be implemented, for example, in a manner similar to the ROI 250 illustrated in FIG. 6. FIG. 6 illustrates an example of an ROI 250 that includes scanned image of a text character, namely a lowercase 'a'.

Figure 7:
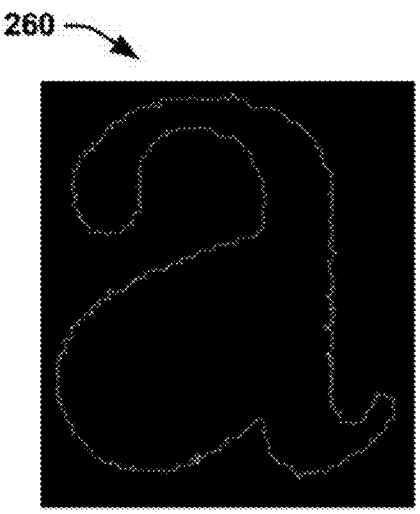
FIG. 7 illustrates an example of a perimeter of a region of interest.

Referring back to FIG. 5, a perimeter of the extracted ROI 204 can be determined. The perimeter of the extracted ROI 204 could be implemented, for example, as a border between a background (e.g., a light area) of a text character and an interior (e.g., a dark area) of the text character. FIG. 7 illustrates an example of a perimeter 260 that has been determined for the text character of the ROI 250 illustrated in FIG. 6. In some examples, differential features can be subtracted from a modal character that corresponds to a character with a minimum mean sum square error from each of the N number of print samples 4 illustrated in FIG. 1.

Figure 8:
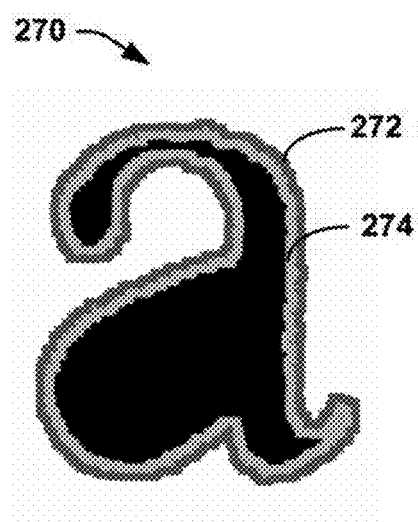
FIG. 8 illustrates an example of salient search areas of a region of interest.

Referring back to FIG. 5, salient perimeter search areas 206 can be determined based on the perimeter of the extracted ROI 202. The distribution-based feature set extractor 200 can identify satellites that correspond to pixels in an outermost salient perimeter search area 206. The distribution-based feature set extractor 200 can also identify porosities that correspond to pixels in a middle salient perimeter search area 206. FIG. 8 illustrates an example of the text character 270 of the ROI 250 illustrated in FIG. 6, wherein the salient perimeter search areas are highlighted. The outermost salient perimeter search area 272 includes satellites, and a middle salient search area 274 includes porosities.

Referring back to FIG. 5, the satellites and the porosities of the extracted ROI 202 can be provided to a feature selector 208. The feature selector 208 can determine the relevant feature to provide as the feature set in a feature record 210. In some examples, the feature selector 208 can access data storage and compare the satellites and the porosities of the extracted ROI 202 to a trained data set. The trained data set could be implemented, for example, as a set of satellites and porosities extracted from reference ROIs that are provided from a known source (e.g., a trusted source, a known counterfeiter, etc.). For instance, the feature selector 208 can select features based on an accuracy rate for the trained data sets and how closely the satellites and porosities of the extracted ROI 202 match the satellites and porosities extracted from the reference ROIs.

In other examples, to determine the relevant features to provide as the feature set in the feature record 210, the feature selector 208 can select a satellite and/or a porosity of the extracted ROI 202 based on modal clustering. Modal clustering can be employed to determine which feature belongs to a group that has similar behavior in clustering. For instance, if the distribution-based feature set extractor 200 receives an extracted ROI 202 from each of the N samples illustrated in FIG. 1 (in an example where N is equal to 1000), the distribution-based feature set extractor 200, and each extracted ROI 202 has about 100 features, by employing clustering techniques (e.g., K-means or nearest neighbor) the distribution-based feature set extractor 200 could find clusters that provide similar behavior in their clustering. For instance, in one example, the distribution-based feature set extractor 200 can examine each of the 100 features individually to determine the number of clusters each feature produces. In the situation where there are 1000 different print samples, and the 100 features are individually considered, a given set of 20 features could produce two clusters with, for example, 700 print samples in a first cluster and 300 print samples in a second cluster, such that the two clusters would be defined by the 20 different features. Similarly, in such a situation, after examining each of the 100 features, the distribution-based feature set extractor 200 could also find 3 clusters defined by 40 different features, 4 clusters defined by 20 different features, 5 clusters defined by 10 different features and 6 or more clusters defined by 10 different features. Thus, in the present example, the distribution-based feature set extractor 200 could select the 40 different features that define the 3 clusters as the feature set to include in the feature record 210, since 3 clusters is the most common, or modal, number of clusters formed when analyzing each feature individually.

Figure 9:
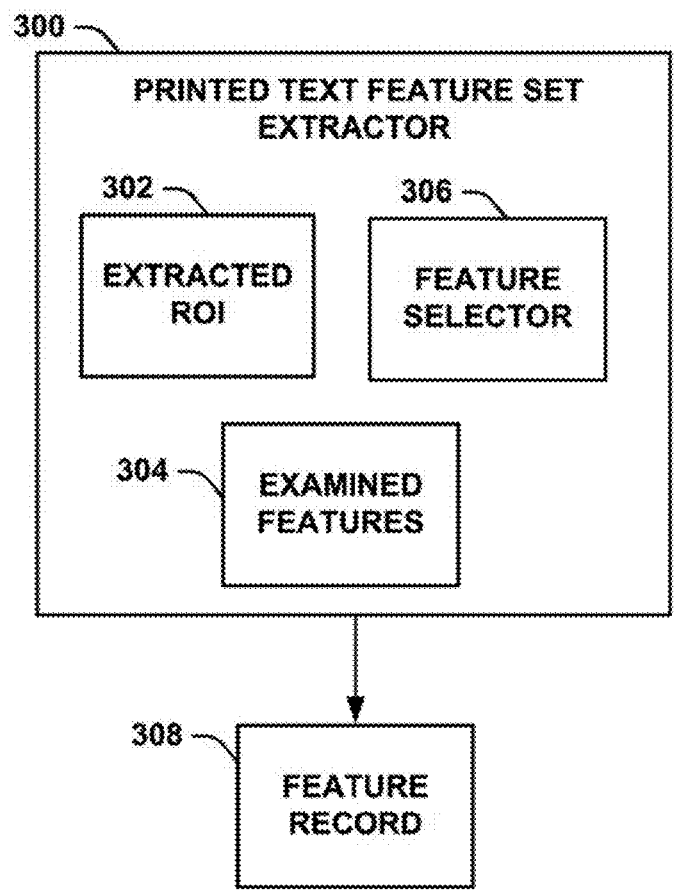
FIG. 9 illustrates an example of a printed text feature set extractor.

FIG. 9 illustrates an example of a printed text feature set extractor 300 that could be employed as the feature set extractor 16 illustrated in FIG. 1, or as a component thereof. The printed text feature set extractor 300 can extract a feature from an extracted ROI 302 of a print sample by employing geometric comparison techniques. The extracted ROI 302 could be implemented, for example, in a manner similar to the ROI 250 illustrated in FIG. 6.

Referring back to FIG. 9, geometric features of the extracted ROI 302 can be examined. For instance, the printed text feature set extractor 300 can examine a major/minor axis of the extracted ROI 302, a circularity of the extracted ROI 302 and a position of a centroid of the ROI, etc. Additionally or alternatively, in some examples, the printed text feature set extractor 300 can examine the color gamut of the extracted ROI 302, the optical density, the contrast of extracted ROI 302, etc. The set of features examined by the printed text feature set extractor 300 can be referred to as the examined features 304 of the extracted ROI 302.

The examined features 304 of the extracted ROI 302 can be provided to a feature selector 306. The feature selector 306 can determine the relevant features to provide as the feature set in a feature record 308. In some examples, the feature selector 306 can access data storage and compare the examined features 304 of the extracted ROI 302 to a trained data set. The trained data set could be implemented, for example, as a set of examined features from the reference ROIs that are provided from a known source. For instance, the feature selector 306 can select features based on an accuracy rate for the trained data sets and how closely the examined features 304 of the extracted ROI 302 match the examined features extracted from the reference ROIs.

In other examples, to determine the relevant feature to provide as the feature set in the feature record 308, the feature selector 306 can select geometric features of the extracted ROI 302 based on modal clustering. Modal clustering can be employed to determine which feature belongs to a group that has similar behavior in clustering. For instance, if the printed text feature set extractor 300 receives an extracted ROI 302 from each of the N samples illustrated in FIG. 1, and each extracted ROI 302 has about 100 features and about 1000 print samples, by employing clustering techniques (e.g., K-means or nearest neighbor) the printed text feature set extractor 300 could find clusters with the largest number of different samples with common clustering, such that a threshold percentage (e.g., 98%) of the samples belong to the same cluster for each of the different features inclusively, such that the identified set of these different features can be selected with such a closely-correlated clustering behavior as the feature set in the feature record 308.

Figure 10:
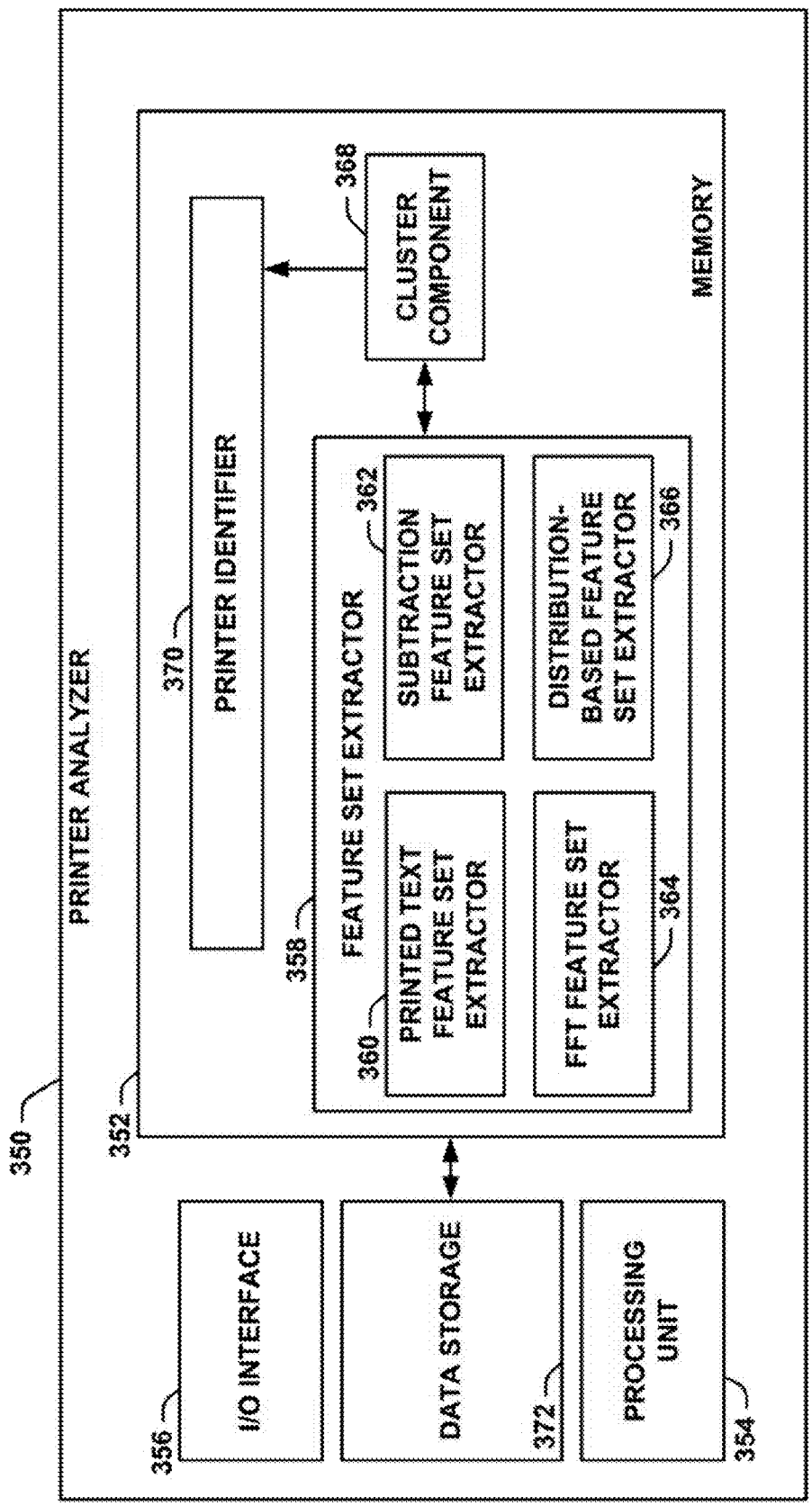
FIG. 10 illustrates an example of a printer analyzer for determining a printer of print samples.

FIG. 10 illustrates an example of a printer analyzer 350 that could be employed, for example, as the printer analyzer 10 illustrated in FIG. 1. The printer analyzer 350 can include a memory 352 (e.g., RAM and/or a hard disk) for storing machine readable instructions. The printer analyzer 350 can also include a processing unit 354 (e.g., a processor core) to access the memory 352 and execute the machine readable instructions. In some examples, the printer analyzer 350 can be a system external to a scanner. In such a situation, an I/O interface 356 can be implemented as a network or universal serial bus (USB) port. In other examples, the printer analyzer 350 can be implemented as a system integrated with the scanner. In such a situation, the I/O interface 356 can include a data bus for communicating with the scanner.

The printer analyzer 350 can receive (e.g., at the I/O interface 356) digital images of N number of print samples that have been scanned by a scanner. In such a situation the digital images of the N number of print samples can be provided to a feature set extractor 358 of the memory 352.

The feature set extractor 358 can include a printed text feature set extractor 360 that can extract a feature set related to printed text of an ROI of a given print sample of the N number of print samples. The printed text feature set extractor 360 could be implemented, for example in a manner similar to the printed text feature set extractor 300 illustrated in described with respect to FIG. 9. The feature set extractor 358 can also include a subtraction feature set extractor 362 that can extract the feature set from the ROI of the given print sample of the N number of print samples based on a subtraction of images to extract differential features. In some examples, the subtraction feature set extractor 362 could be implemented in a manner similar to the subtraction feature set extractor 100 illustrated in FIG. 3. The feature set extractor 358 can further include an FFT feature set extractor 364 that can extract a feature set based on a calculation of an FFT of the ROI of the given print sample of the N number of print samples. The FFT feature set extractor 364 could be implemented, for example, in a manner similar to the FFT feature set extractor 150 illustrated in FIG. 4. The feature set extractor 358 can still further include a distribution-based feature set extractor 366 that can determine distribution-based features of the ROI of the given print sample. The distribution-based feature set extractor 366 could be implemented, for example, in a manner similar to the distribution-based feature set extractor 200 illustrated in FIG. 5. In some examples, the feature set extractor 358 could be implemented as a subset of the printed text feature set extractor 360, the subtraction feature set extractor 362, the FFT feature set extractor 364 and the distribution-based feature set extractor 366.

The feature set extractor 358 can combine the extracted feature set provided from each of the printed text feature set extractor 360, the subtraction feature set extractor 362, the FFT feature set extractor 364 and the distribution-based feature set extractor 366 (or some subset thereof) to provide an extracted feature set. The feature set extractor 358 can provide a feature record to a cluster component 368 that can include the extracted feature set and a sample identifier that can identify the print sample from which the feature set was extracted. In some examples, the feature set extractor 358 can pre-train the extracted feature sets by employing known-printed samples made with specific types of printer (e.g., inkjet and LaserJet, flexo, Gravure, etc.). In such a situation, a best feature set from the feature sets that best differentiate the specific types of printers can be determined and each feature set can be tested until a best clustering behavior can be determined. The best clustering behavior can be implemented as a best ratio of "between-aggregate" variance divided by "within-aggregate" variance (e.g., a statistical F-ratio).

The cluster component 368 can receive a feature record for each of the N number of print samples. The cluster component 368 can employ clustering techniques (e.g., K-means or nearest neighbor techniques) to determine a cluster space with clusters corresponding to print samples. The cluster space and an identification of the clusters can be provided to a printer identifier 370 as cluster data. The printer identifier 370 can employ the cluster data to determine the printer that was employed to print each of the N number of print samples. In some examples, the printer identifier 370 can access a data storage 372 to compare a feature set associated with a given cluster to a feature set associated with the cluster from a known origin extracted from the data storage 372 to determine the type of printer (e.g., a flexo printer, an offset printer, a Gravure printer, an inkjet printer, a LaserJet printer, etc.) employed to print each print sample. For instance, in some examples, if there are five different types of printers (flexo, offset, Gravure, inkjet and Laserjet), ten pairwise clusters can be formed using clustering behavior based on pairwise metrics to identify two specific types of printers.

Employment of the printer analyzer 350 allows a user of the printer analyzer 350 to identify the printer employed to print a given print sample. In some situations, identification of the printer of a given print sample can be employed to determine if the print sample originated from an authentic source, such as an OEM, or if the print sample originated from a counterfeiter.

Figure 12:
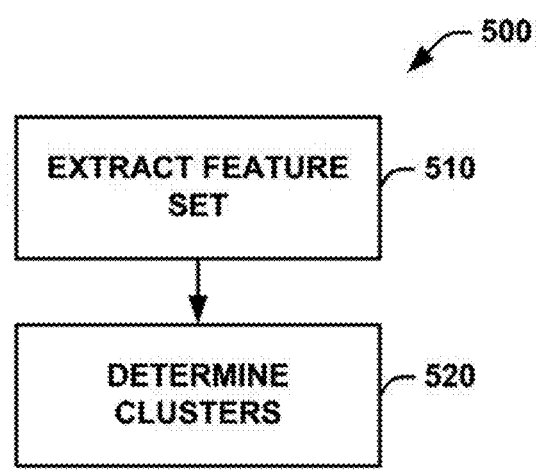
FIG. 12 illustrates another example of a flowchart of an example method for determining a printer of print samples.
Figure 11:
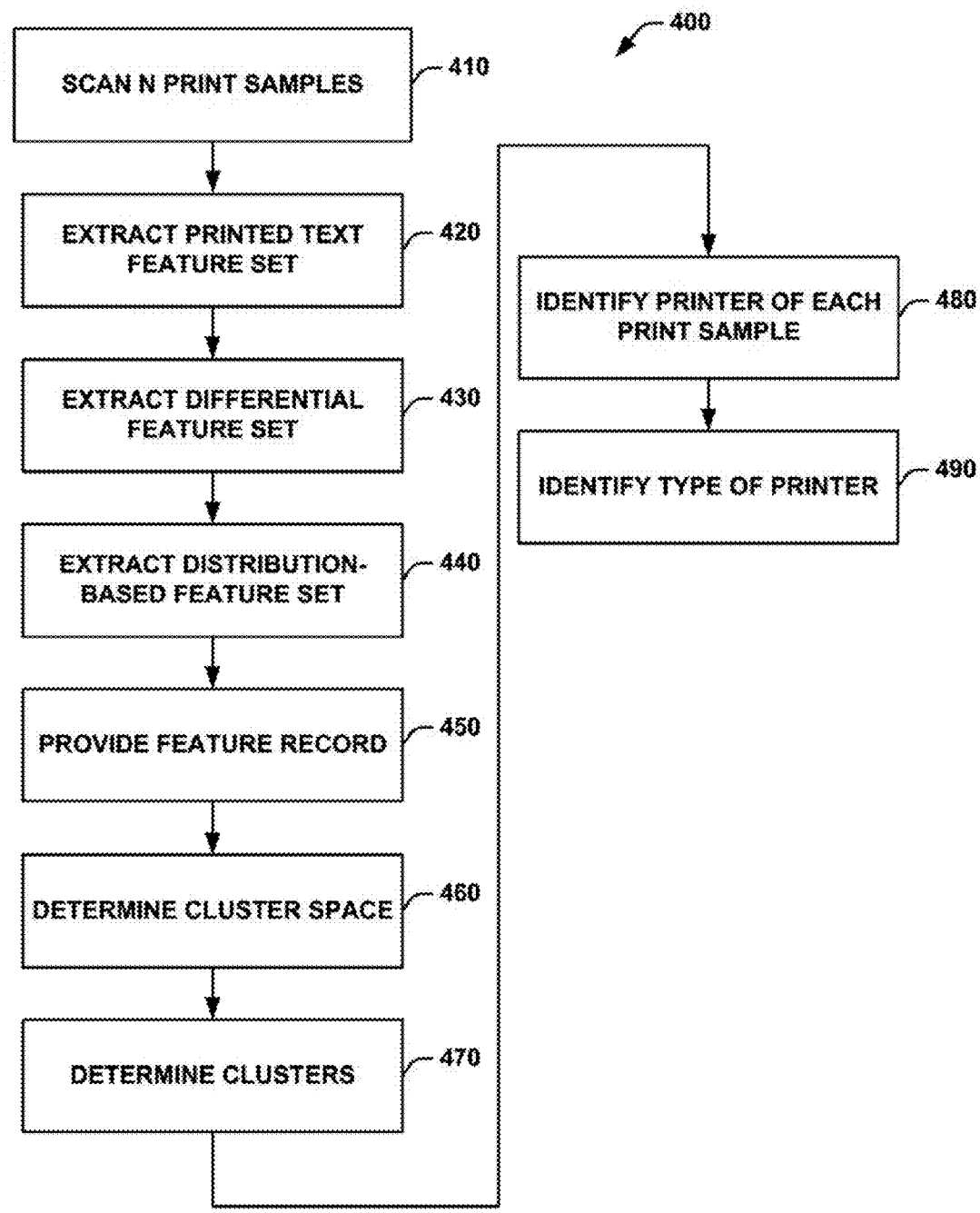
FIG. 11 illustrates an example of a flowchart of an example method for determining a printer of print samples.

In view of the foregoing structural and functional features described above, example methods will be better appreciated with reference to FIGS. 11 and 12. While, for purposes of simplicity of explanation, the example methods of FIGS. 11 and 12 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 11 illustrates an example of a flowchart of an example method 400 for identifying a printer of a print sample, such as a print sample 6 of the N number of print samples 4 illustrated in FIG. 1. The method 400 could be implemented, for example, by a printer analyzer, such as the printer analyzer 10 illustrated in FIG. 1 and/or the printer analyzer 350 illustrated in FIG. 10.

At 410, the N number of print samples can be scanned by a scanner, such as the scanner 8 illustrated in FIG. 1 to provide a digital image of each of the print samples. At 420, a printed text feature set can be extracted, for example, by the printed text feature set extractor 300 illustrated in FIG. 9 from an ROI of a given digital image of the digital images of the N number of print samples, which ROI can be referred to as the given ROI of the given print sample. At 430 a differential feature set can be extracted, by the subtraction feature set extractor 100 illustrated in FIG. 3 and/or the FFT feature set extractor 150 illustrated in FIG. 4 from the given ROI of the given print sample. At 440, a distribution-based feature set can be extracted from the given ROI of the given print sample, for example, by the distribution-based feature set extractor 200 illustrated in FIG. 5.

At 450, a feature set extractor of the printer analyzer can provide a feature record to a cluster component (e.g., the cluster component 20 illustrated in FIG. 1) corresponding to the given ROI of the given print sample. The feature record can include the extracted feature set in actions 420-440 for some subset thereof) as well as data identifying the given print sample, from which the extracted feature set is derived.

At 460, the cluster component can determine a cluster space that maps the feature set of each of the N number of print samples. At 470, the cluster component can determine clusters based on the cluster space. The cluster component could use clustering techniques, such as K-means, nearest neighbor, etc. At 480, a printer identifier of the printer analyzer can examine the clusters and the cluster space to identify a printer of each print sample of the N number of print samples. At 490, the printer identifier can identify a type of printer employed to print each of the print samples.

FIG. 12 illustrates another flowchart of an example method 500 for determining a printer of each of a plurality of print samples. At 510 a feature set extractor can extract a feature set from each of a plurality of digital images of print samples. At 520, a cluster component can determine clusters corresponding to the print samples based on the feature set of each of the digital images of the print samples. Each member of a given cluster of the clusters can correspond to a print sample of the print samples that was printed with a common printer. The feature set can be a filtered feature set characterizing a printer of a given print sample.

Figure 13:
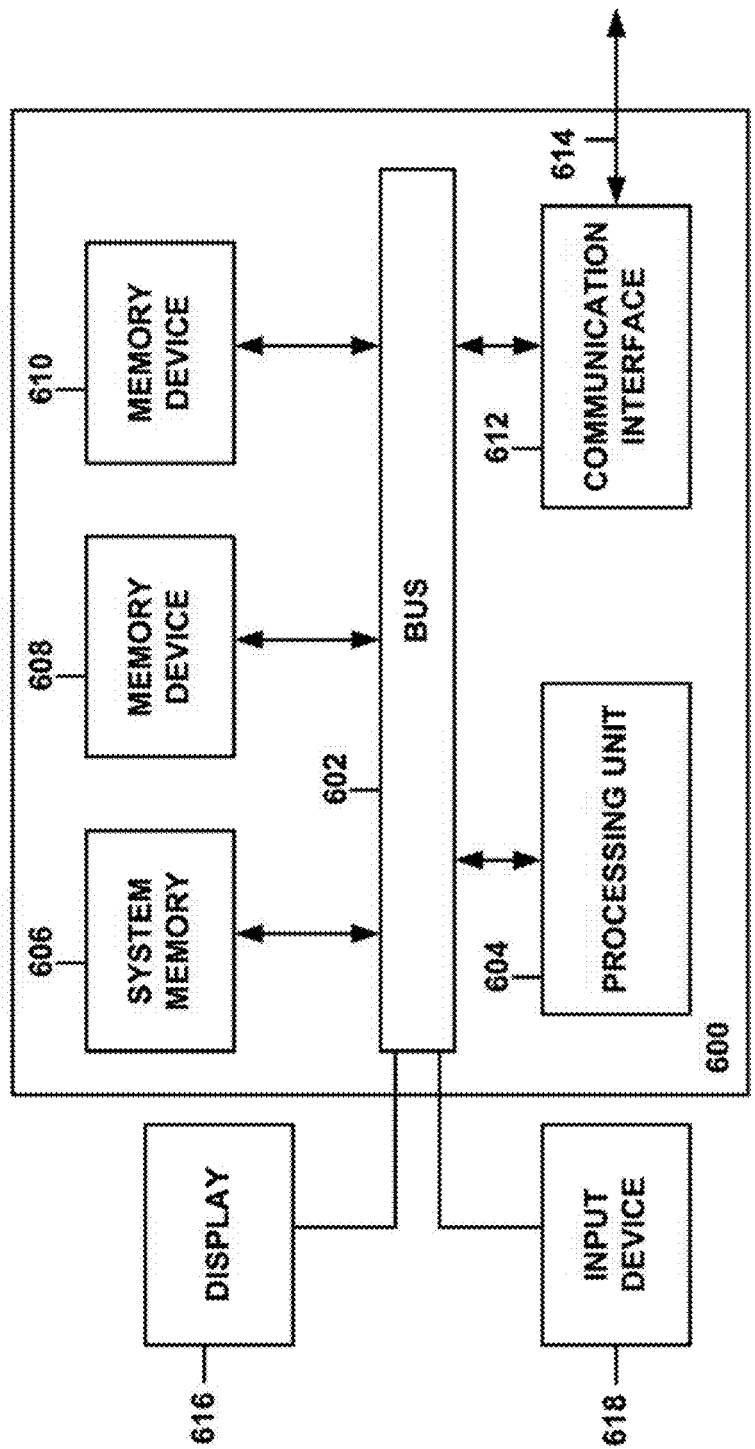
FIG. 13 illustrates an example of a computer system that can be employed to implement the systems and methods illustrated in FIGS. 1-12.

FIG. 13 is a schematic block diagram illustrating an example system 600 of hardware components capable of implementing examples disclosed in FIGS. 1-12, such as the printer analyzer 10, 350 illustrated in FIGS. 1 and 10 as well as portions of the scanner 8 illustrated in FIG. 1. The system 600 can include various systems and subsystems. The system 600 can be a personal computer, a laptop computer, a workstation, a computer system, an appliance, an application-specific integrated circuit (ASIC), a server, a server blade center, a server farm, a mobile device, such as a smart phone, a personal digital assistant, an interactive television set, an Internet appliance, portions of a printer, etc.

The system 600 can include a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 804 and the system memory 606. The additional memory devices 608 and 610, such as a hard disk drive, server, stand alone database, or other non-volatile memory, can also be in communication with the system bus 602. The system bus 602 operably interconnects the processing unit 604, the memory devices 606-610, the communication interface 612, the display 616, and the input device 618. In some examples, the system bus 602 also operably interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processor core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, disk drive, compact disk (CD), or server accessible over a network. In certain examples, the memories 606, 608 and 610 can comprise text, images, video, and/or audio.

Additionally, the memory devices 608 and 610 can serve as databases or data storage such as the data storage 370 illustrated in FIG. 10 and/or the memory 14 or 352 illustrated in FIGS. 1 and 10. Additionally or alternatively, the system 600 can access an external system (e.g., a web service) through the communication interface 612, which can communicate with the system bus 602 and the communication link 614.

In operation, the system 600 can be used to implement, for example, a printer analyzer and/or a scanner. Machine (e.g., computer) executable logic implementing the system, such as the memory 14 of the printer analyzer 10 illustrated in FIG. 1 and or the memory 352 of the printer analyzer 350 illustrated in FIG. 10, can reside in the system memory 606, and/or in the memory devices 608 and/or 610 in accordance with certain examples. The processing unit 604 executes machine readable instructions originating from the system memory 606 and the memory devices 608 and 610. In such an example, the system memory 606 and/or the memory devices 608 and/or 610 could be employed, for example, to implement the memory 14 illustrated in FIG. 1 and/or the memory 352 illustrated in FIG. 10. The term "computer readable medium" as used herein refers to a medium that participates in providing instructions to the processing unit 604 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A system comprising:
   a memory to store machine readable instructions; and
   a processing unit to access the memory and execute the machine readable instructions, the machine readable instructions comprising:
   a feature set extractor comprising a Fast Fourier Transform (FFT) extractor to extract a feature set from a region of interest (ROI) of each of a plurality of digital images of print samples, wherein the feature set comprises a differential coefficient for the ROI based on an energy spectral density (ESD) of a first Fast Fourier Transform (FFT) of the ROI and an ESD of a FFT of a reference ROI, wherein the feature set is a filtered feature set that includes a feature set characterizing a printer that printed a given print sample of the print samples;
   a cluster component to determine clusters of the print samples based on the feature set of each of the plurality of scanned images of the print samples; and
   a printer identifier to identify the printer of the print samples based on the clusters of the print samples.

2. The system of claim 1, wherein the feature set extractor further comprises a printed text feature set extractor to extract another feature set from the ROI based on geometric characteristics of the ROI.

3. The system of claim 1, wherein the feature set extractor further comprises a subtraction feature set extractor to extract another feature set from the ROI based on a subtraction of a reference image from the ROI.

4. The system of claim 3, wherein the reference image is based on an image of the ROI provided from a known source.

5. The system of claim 4, wherein the reference image is based on a modal image derived from an average of an ROI from each of the images of the plurality of print samples.

6. The system of claim 1, wherein the feature set extractor further comprises a distribution-based feature set extractor to extract another feature set from the ROI based on a search of a defined search area in the ROI.

7. The system of claim 1, wherein the cluster component is further to determine a cluster space that maps a feature set corresponding to each of the plurality of print samples.

8. The system of claim 1, wherein the printer identifier is further to determine a type of printer employed to print each of the plurality of print samples.

9. A method comprising:
extracting, by a system comprising a processor, a feature set from a region of interest (ROI) in each of a plurality of digital images of print samples, comprising:
determining a Fast Fourier Transform (FFT) of the ROI;
determining the FFT of a reference ROI;
determining an energy spectral density (ESD) of the FFT of the ROI;
determining another ESD of the FFT of the reference ROI; and
determining a differential coefficient for the ROI based on the ESD and the another ESD,
wherein the feature set is a filtered feature set characterizing a printer of a given print sample; and
determining, by the system, clusters corresponding to the print samples based on the feature set of each of the digital images of the print samples, wherein each member of a given cluster of the clusters corresponds to a print sample of the print samples that was printed with a common printer.

10. The method of claim 9, further comprising identifying, by the system, a printer type for the common printer.

11. The method of claim 9, further comprising scanning, by the system, the plurality of print samples to provide the digital images of the print samples.

12. The method of claim 9, further comprising extracting, by the system, another feature set from the ROI based on geometric characteristics of the ROI.

13. The method of claim 9, further comprising extracting, by the system, another feature set from the ROI based on a subtraction of a reference image from the ROI.

14. The method of claim 9, further comprising identifying, by the system, the printer of the print samples based on the clusters of the print samples.

15. A system comprising:
a scanner to provide a digital image of a plurality of print samples; and
a printer analyzer comprising:
a memory to store machine readable instructions; and
a processing unit to access the memory and execute the machine readable instructions, the machine readable instructions comprising:
a feature set extractor comprising:
a printed text feature set extractor to extract a first feature set based on geometric features of a region of interest (ROI) of a given digital image of the plurality of digital images of the print samples;
a subtraction feature set extractor to extract a second feature set based on differential features determined by a subtraction of the ROI of the given digital image;
a Fast Fourier Transform (FFT) extractor to extract a third feature set based on differential features determined by an FFT of the ROI of the given digital image; and
a distribution-based feature set extractor to extract a fourth feature set based on a search of a search area in the ROI of the given digital image;
wherein the feature set extractor is to combine the first, second, third and fourth feature sets to provide an extracted feature set;
a cluster component to:
plot an extracted feature set corresponding to each of the print samples to form a cluster space; and
determine clusters in the cluster space; and
a printer identifier to:
identify a printer employed to print each of the print samples based on the clusters in the cluster space to provide a plurality of identified printers; and
identify a printer type of each of the plurality of printers.

* * * * *